J. K. GARDNER.
VEHICLE SUSPENSION.
APPLICATION FILED APR. 12, 1910.

980,508.

Patented Jan. 3, 1911.

Witnesses
C. M. Shannon
R. E. McBreen

Inventor
Joseph K. Gardner
By
Attorneys

UNITED STATES PATENT OFFICE.

JOSEPH K. GARDNER, OF WYANDOTTE, MICHIGAN.

VEHICLE SUSPENSION.

980,508.     Specification of Letters Patent.     Patented Jan. 3, 1911.

Application filed April 12, 1910. Serial No. 554,942.

*To all whom it may concern:*

Be it known that I, JOSEPH K. GARDNER, a citizen of the United States of America, residing at Wyandotte, in the county of Wayne and State of Michigan, have invented certain new and useful Improvements in Vehicle Suspension, of which the following is a specification, reference being had therein to the accompanying drawings.

This invention relates to a motor vehicle suspension and more particularly to an arrangement thereof whereby the vehicle wheels are canted in turning a corner in proportion to the sharpness of the turn. This transmits the side thrust due to the inertia of the vehicle to the wheel hub in direct line of the spokes and avoids the tendency to rack or dish the wheels.

Another feature of the invention is the maintaining of the clearance between the road and the frame of the vehicle in all positions assumed by the wheels.

The invention consists in the matters hereinafter set forth, and more fully described in the appended claims.

Figure 1:
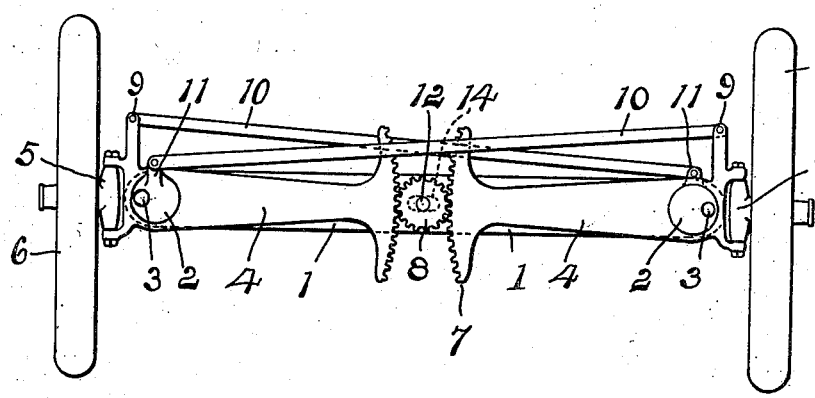
Figure 2:
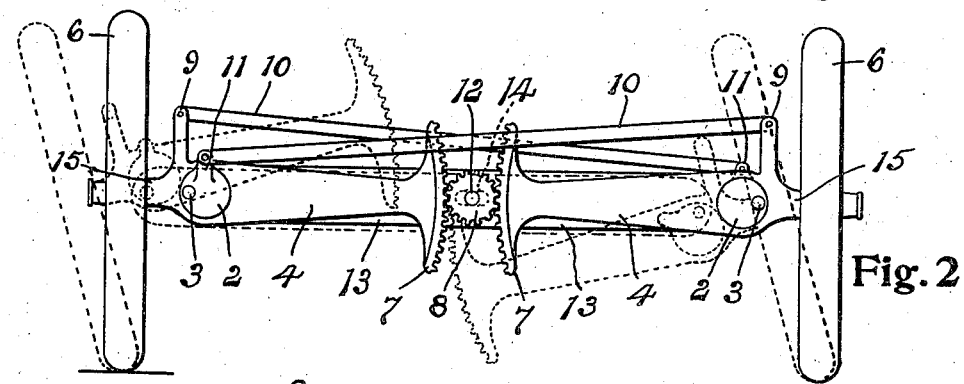

Referring to the drawings, Figure 1 is a view in elevation of the front axle of a motor vehicle with adjacent parts, all embodying features of the invention; Fig. 2 is a view of the rear axle of the vehicle showing in dotted lines the position assumed in rounding a corner; and Fig. 3 is a plan view, largely diagrammatic, of a vehicle suspension system.

In the drawings a one piece front axle 1 has at each end a disk 2 journaled to oscillate in a vertical plane on a pivot stud 3 to which the disk is secured eccentrically. Arms 4 are pivoted on the disks 2 and are provided at their outer ends with bearing knuckles 5 on which steering bearing wheels 6 are rotatably secured. Segmental racks 7 are formed on the inner ends of the arms 4 and are in mesh with an intermediate pinion 8. A transversely extending lug 9 on each arm 4 is coupled by a rigid link 10 to a rock arm 11 extending from each eccentric disk.

The pinion 8 is non-rotatably secured on a shaft 12 extending to a rear axle 13, the shaft being journaled in suitable bearings on the stationary members of these axles which have limited lateral play thereon as by engagement with transverse slots 14. The rear axle of the vehicle is built in all respects like the forward axle, the parts being similarly numbered with the exception of skeins 15 which replace the steering knuckles 5.

Figure 3:
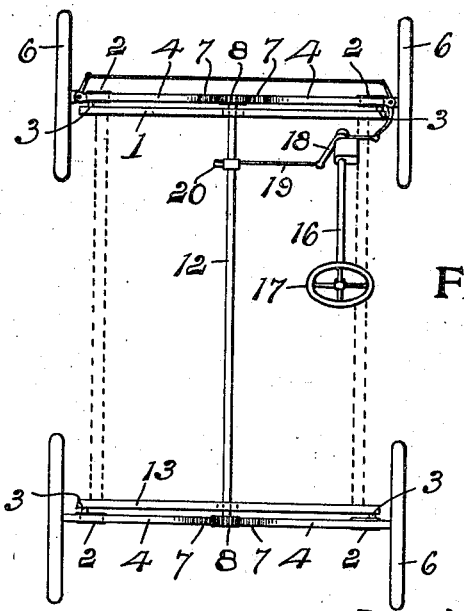

A steering post 16 and hand wheel 17, indicated diagrammatically in Fig. 3 have the usual operative connections with the forward wheels. The steering shaft 16 is likewise coupled by a rock arm 18, link 19, and rock arm 20 to the longitudinal shaft 12. As a result of this construction the swinging of the forward wheel by the hand wheel 17 is accompanied by their tilting in a vertical plane so that the thrust resulting from the momentum of the vehicle is transmitted in direct line through the spokes of the wheels to the hubs thus avoiding any tendency of the wheels to dish. Furthermore as the skeins or knuckles rock, their lugs 9 swing the eccentrically mounted disks 2 on which the segment arms are fulcrumed, to raise or lower the axle bodily in reference to the wheel knuckles or skeins so that the body of the vehicle does not tilt. This also insures greater ease and comfort in riding and to a large extent avoids the tendency of the vehicle to skid when making turns at high speed.

Obviously, changes in the details of construction may be made without departing from the spirit of the invention and I do not care to limit myself to any particular form or arrangement of parts.

I claim—

1. In a motor vehicle, forward and rear axles, bearing wheels thereon, means for tilting the wheels simultaneously in vertical planes, steering means for deflecting the forward wheels adapted to operate the tilting means and means for maintaining a predetermined clearance between the axles and the ground on which the wheels rest in all positions assumed by the wheels.

2. In a motor vehicle, forward and rear axles, segment arms pivoted thereon to swing in a vertical plane, bearing wheels each journaled on the outer end of a segment arm, means for simultaneously oscillating the segment arms, steering means for deflecting the forward wheels adapted to operate the arm oscillating means, and means for shifting the pivot centers of the arms on the axles, adapted to maintain a predetermined road clearance for the axles.

3. In a motor vehicle, forward and rear axles, studs near the outer ends of each axle; a disk eccentrically secured on each stud to rotate in a vertical plane parallel to the axle, segment arms each pivoted on a disk, bearing wheels journaled on the outer ends of the arms, means for oscillating the arms simultaneously on the disks, means to rotate the disks and steering means for deflecting the forward wheels and operating the arm oscillating means.

4. In a motor vehicle, forward and rear axles, disks journaled eccentrically on each axle to rotate in a vertical plane parallel to the axle, a segment arm pivoted on each disk, a rock arm extending from each eccentric, a link coupling each rock arm with a lug extending from the opposite segment arm, means for simultaneously oscillating the arms, bearing wheels on the segment arms, and steering means for deflecting the forward wheels and for operating the segment arms oscillating means.

5. In a motor vehicle, forward and rear axles, a pivot stud near the end of each axle, disks eccentrically journaled on the studs to rotate in a plane parallel to the axle, segmental arms each pivoted on a disk, bearing wheels journaled on the outer ends of the arms, a shaft extending longitudinally from axle to axle, a pinion on the shaft between the inner ends of each pair of arms, segmental racks on the arms meshing with the gears, steering means for deflecting the forward wheels adapted to rock the shaft in proportion to the deflection of the forward wheels, and means for shifting the disks to hold the axles substantially parallel to their initial position.

6. In a motor vehicle, forward and rear axles, disks journaled eccentrically on each axle to rotate in a plane parallel to the axle, segment arms each pivoted on a disk, bearing wheels journaled on the outer ends of the arms, a shaft extending longitudinally from axle to axle, a pinion on the shaft between the inner ends of each pair of arms, segmental racks on the arms meshing with the gears, steering means for deflecting the forward wheels which rocks the shaft in proportion to the deflection of the forward wheels, means for shifting the disks to hold the axles in substantially parallel relation to their initial position, and bearings for the shaft on the axles having limited movement longitudinally of the axles.

7. In a motor vehicle, forward and rear axles, a pair of arms pivoted near the outer ends of each axle to oscillate in vertical planes, bearing wheels each journaled on the outer end of each arm, a shaft extending from axle to axle, a pinion on the opposite ends of said shaft between the inner adjacent ends of the arms, segmental racks on the arms in mesh with the pinion, a steering wheel shaft operatively connected to the forward wheels to deflect the same, a rock arm and link connection between said steering wheel shaft and the pinion shaft adapted to rock the latter in proportion to the deflection of the forward wheels.

In testimony whereof I affix my signature in presence of two witnesses.

JOSEPH K. GARDNER.

Witnesses:
OTTO F. BARTHEL,
ANNA M. DORR.